(12) United States Patent
Werner et al.

(10) Patent No.: US 10,475,298 B1
(45) Date of Patent: Nov. 12, 2019

(54) ASSISTING CABLE USE BY LOCATING CONNECTOR ENDS OF THE CABLE

(71) Applicant: INTERNATIONAL BUSINESS MACHINES CORPORATION, Armonk, NY (US)

(72) Inventors: John S. Werner, Fishkill, NY (US); Matteo Cocchini, Long Island City, NY (US); Arkadiy O. Tsfasman, Wappingers Falls, NY (US); Budy D. Notohardjono, Poughkeepsie, NY (US); Noah Singer, New City, NY (US); Daniel J. Kearney, Ulster Park, NY (US); Robert K. Mullady, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/031,082

(22) Filed: Jul. 10, 2018

(51) Int. Cl.
*G08B 1/08* (2006.01)
*G08B 5/36* (2006.01)
(Continued)

(52) U.S. Cl.
CPC ............ *G08B 5/36* (2013.01); *F21V 23/0435* (2013.01); *G06K 19/0723* (2013.01);
(Continued)

(58) Field of Classification Search
CPC ..... G02B 6/3895; G08B 5/36; H04L 43/0811; H01R 13/70; H01R 13/6463;
(Continued)

(56) References Cited

U.S. PATENT DOCUMENTS 6,968,994 B1 * 11/2005 Ashwood Smith .. G01R 31/023
235/375
7,250,867 B2 7/2007 Sakama et al.
(Continued)

FOREIGN PATENT DOCUMENTS

CN 107644179 A 1/2018
KR 20160025806 A 3/2016

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).
(Continued)

*Primary Examiner* — Toan N Pham
(74) *Attorney, Agent, or Firm* — Teddi Maranzano, Esq.; Kevin P. Radigan, Esq.; Heslin Rothenberg Farley & Mesiti P.C.

(57) ABSTRACT

Methods, systems and computer program products are provided for assisting use of a cable by locating connector ends of the cable. The process includes obtaining saved cable identifying information received, or saved, from a tag circuit associated with a connector end of a cable of a plurality of connector ends of multiple cables, and comparing the saved cable identifying information with cable identifying information of an other tag circuit associated with an other connector end of the plurality of connector ends. Based on the comparing identifying a cable match, the cable match is indicated via an indicator associated with the other connector end, thereby identifying the other connector end as part of the cable to facilitate use of the cable.

20 Claims, 13 Drawing Sheets

(51) Int. Cl.
*H01R 13/46* (2006.01)
*H02G 15/02* (2006.01)
*G06K 19/07* (2006.01)
*F21V 23/04* (2006.01)
*F21Y 115/10* (2016.01)

(52) U.S. Cl.
CPC ............ *H01R 13/465* (2013.01); *H02G 15/02* (2013.01); *F21Y 2115/10* (2016.08); *H02G 2200/20* (2013.01)

(58) Field of Classification Search
CPC ...... H01R 13/641; H01R 13/665; H01R 9/22; G06K 7/01; G06K 7/10415
USPC ............................ 340/539.11, 10.1; 439/713
See application file for complete search history.

(56) References Cited

U.S. PATENT DOCUMENTS

| | | | |
|---|---|---|---|
| 7,307,408 B2 | 12/2007 | Porcu et al. | |
| 7,605,707 B2 * | 10/2009 | German | H01R 13/465 340/572.7 |
| 7,965,186 B2 * | 6/2011 | Downie | G02B 6/38 235/375 |
| 8,428,405 B2 | 4/2013 | Kewitsch | |
| 8,674,823 B1 | 3/2014 | Contario et al. | |
| 9,360,516 B2 | 6/2016 | Gotschall et al. | |
| 2014/0138431 A1 * | 5/2014 | Standish | G06K 7/10415 235/375 |
| 2016/0020851 A1 | 1/2016 | Glaser | |
| 2018/0013647 A1 | 1/2018 | Scherer et al. | |

OTHER PUBLICATIONS

Majekodunmi, Muyinat. O., "Utilization Automatic Identification Tracking Systems to Compile Operational Field and Structure Data," Doctoral Dissertation, University of Maryland, College Park, 2014 (135 pages).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," Apr. 9, 2015, (pp. 1-1527).

* cited by examiner

ASSISTING CABLE USE BY LOCATING CONNECTOR ENDS OF THE CABLE

BACKGROUND

In system networking, such as computer networking, situations exist where a user or operator may be required to plug a large number of cables. For instance, a server network may contain tens or even hundreds, or more, cables to be connected. Even if a user knows where to plug a particular cable, there may be a number of similar cables that may have been plugged at a first cable end which would need to be traced back from a second cable end in order to ascertain which particular cable a user may be holding to determine where to plug the second end. Additionally, situations may exist where a cable is long enough that a user plugging one end of a cable may not be able to see the other end. For instance, cables may span between front and back sides of a computer rack, or between computer racks, or across a data center, or even across separate rooms of a facility, etc., each of which may make tracing a particular cable more difficult and time consuming. Further, even before being plugged, many cables may be tangled together, such as in a container, or on a table or floor, where it would be advantageous to know which cable connectors are attached to the same cable, for instance, to select a particular cable for use in assembling, upgrading or reconfiguring a network or system.

SUMMARY

Certain shortcomings of the prior art are overcome and additional advantages are provided through the provision, in one or more aspects, of a method of assisting cable use by locating connector ends of the cable. The method includes obtaining saved cable identifying information received from a tag circuit associated with one connector end of a cable of a plurality of connector ends of multiple cables, and comparing the saved cable identifying information with cable identifying information of an other tag circuit associated with an other connector end of the plurality of connector ends. The method also includes, based on the comparing identifying a cable match, indicating the cable match via an indicator associated with the other connector end, thereby identifying the other connector end as part of the cable to facilitate use of the cable.

In another aspect, a system for assisting a cable use by locating connector ends of the cable is provided. The system includes a memory and a processing circuit communicatively coupled to the memory. The system performs a method including obtaining saved cable identifying information received from a tag circuit associated with one connector end of a cable of a plurality of connector ends of multiple cables, and comparing the saved cable identifying information with cable identifying information of an other tag circuit associated with an other connector end of the plurality of connector ends. The method performed by the system further includes, based on the comparing identifying a cable match, indicating the cable match via an indicator associated with the other connector end, thereby identifying the other connector end as part of the cable to facilitate use of the cable.

In a further aspect, a computer program product for assisting cable use by locating connector ends of the cable is provided. The computer program product includes a computer readable storage medium having program instructions embodied therewith. The program instructions are executable by a processor to cause the processor to obtain saved cable identifying information received from a tag circuit associated with one connector end of a cable from a plurality of cable ends of multiple cables; compare the saved cable identifying information with cable identifying information of an other tag circuit associated with an other connector end of the plurality of connector ends; and based on the compare identifying a cable match, indicate the cable match via an indicator associated with the other connector end, thereby identifying the other connector end as part of the cable to facilitate use of the cable.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
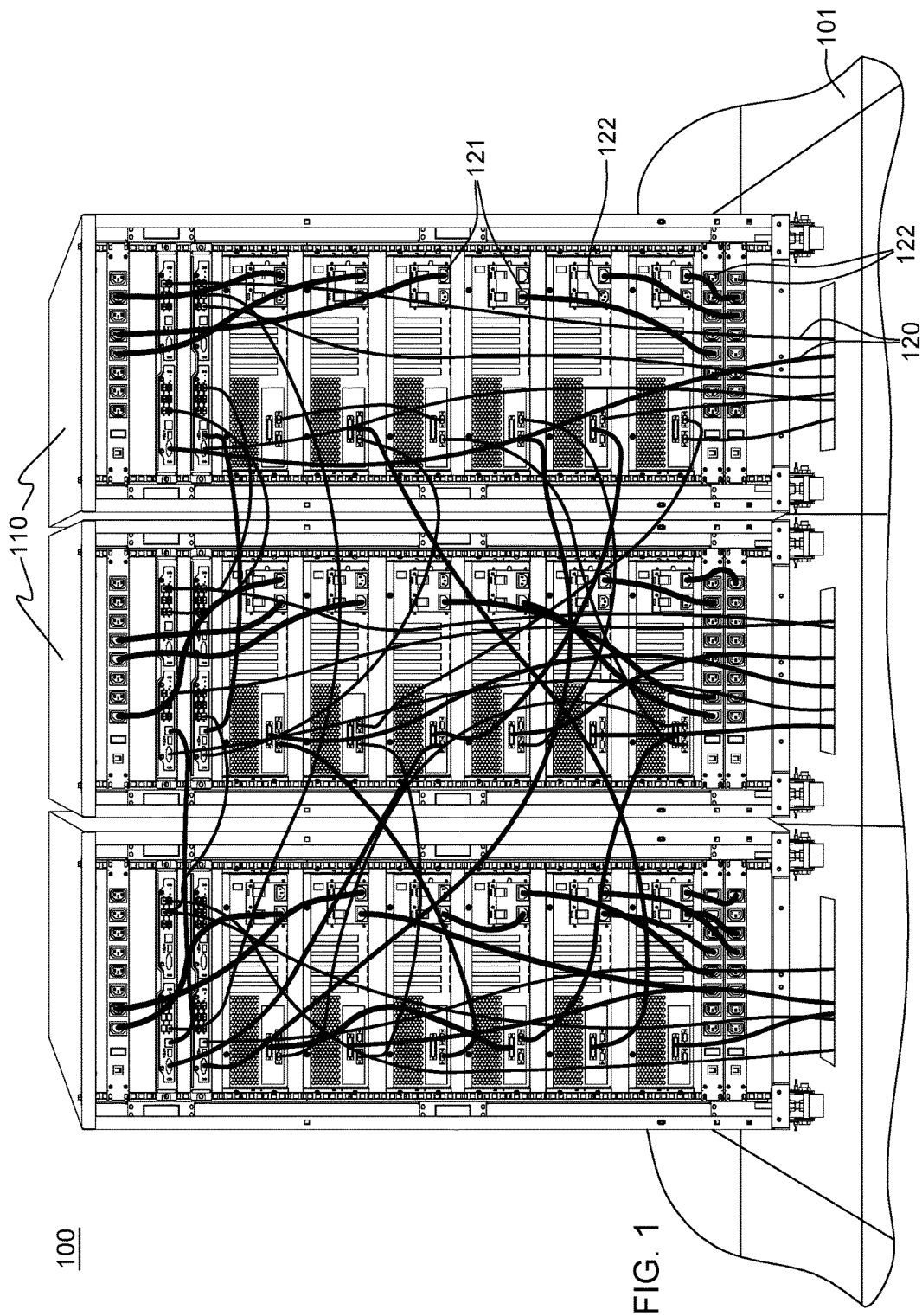
FIG. 1 depicts one embodiment of a computer network with a plurality of cables, for which locating cable connector ends of a particular cable can be used to assist in assembling, upgrading or reconfiguring the computer network, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to assist locating connector ends of the cable, for instance, as part of assembling, upgrading or reconfiguring a network or system.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Networks, such as computer networks, communication networks, and other networks, as well as many electronic or electrical systems, typically rely on cables to connect product components of the network or system to one another. For instance, within a network, a user may be required to plug a large number of cables, and even if a user knows where to plug a particular cable, there may be a number of similar cables that have been plugged at a first cable connector end, which would need to be traced back from a second cable end in order to ascertain which particular cable the user may be holding to determine where to plug the second cable end. Further, situations may exist where a cable is long enough that a user plugging one end of the cable may not be able to see the other end of the cable. For instance, cables may extend between the front and back of a rack, between racks, across a data center, or even span separate rooms of a data center facility, which may make tracing a particular cable difficult and time consuming. Further, as noted, even before being plugged, many cables could be tangled together, such as in a container or on a support surface, where it can be advantageous to know which connectors are connected to the same cable, for instance, in order to select a particular cable for use within the network or system.

Reference is made below to the drawings, which may not be drawn to scale for ease of understanding, wherein the same reference numbers used throughout different figures designate the same or similar components.

By way of example, FIG. 1 depicts one embodiment of a data center 100 with a plurality of racks 110 of computing equipment. In the example of FIG. 1, data center 100 is a raised floor data center, with the plurality of racks 110 residing on a raised floor 101 of data center 100, by way of example only. Note that FIG. 1 may represent a single network, or multiple interconnected networks. Note also that the phrase "network" is used broadly herein to refer to any computer, communications, etc., network or system with two or more product components interconnect by cables. The product components may be any of a variety of components, with a server rack of a data center being one example of a network, or a portion of a network, having a large number of cables to be plugged to achieve a desired setup configuration or reconfiguration. The cables may be, for instance, power cables, input/output cables, or other communications cables, etc. Typically, a cable may have a first cable connector at a first end and a second cable connector at a second end. Note in this regard that the phrases "cable connector end", "cable connector", "connector", and "connector end" are used interchangeably herein. In the example of FIG. 1, multiple cables 120 are shown, each of which has an appropriate cable connector 121 at each end thereof. Further, the product components of the network are shown to have respective plug locations 122 for plugging an appropriate cable into the network to interconnect the product components of the network in the desired configuration. Note also that although typically having a single first end and a single second end, a "cable" as used herein may include a configuration with multiple first ends and/or multiple second ends, each having associated therewith a cable connector (or connector end) to be plugged in the network (e.g., a Y-cable).

As can be understood from the depiction of FIG. 1, it may be a time-consuming process to determine for an individual cable 120 where a particular cable connector 121 at one end of the cable is plugged, or should be plugged, into the network. This is true whether the other end has been plugged into the network, or not. Further, as noted, depending on where a first plug location is relative to a second plug location within the network, it may be difficult to ascertain which cable is which, particularly where the cables are bundled or tangled together. For instance, as shown in FIG. 1, multiple cables can extend from the back of one rack to below the raised floor to other locations within the data center, and thus, where, or even whether, the other end of the cable is plugged may sometimes be difficult to ascertain.

Figure 2:
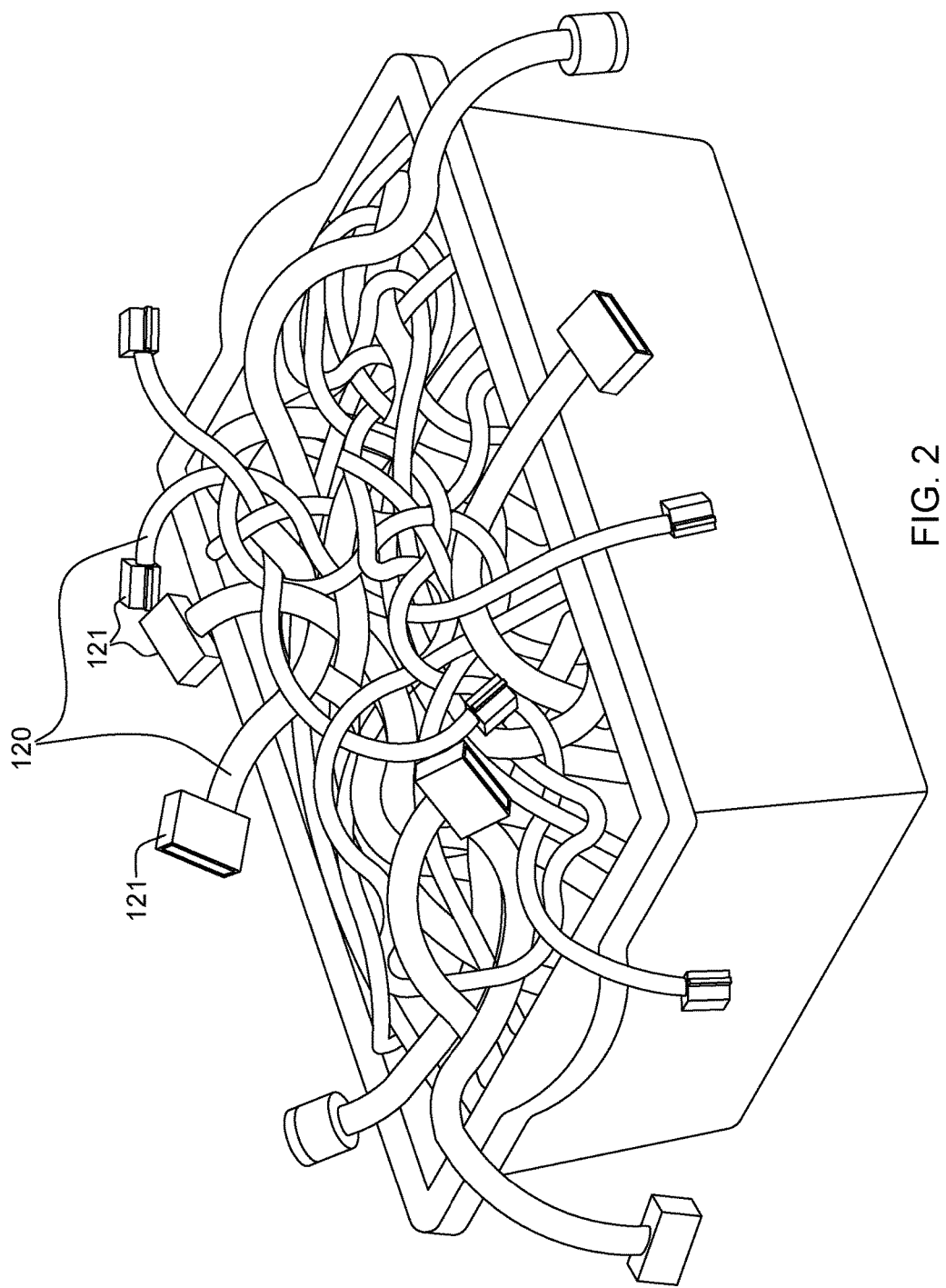
FIG. 2 depicts one embodiment of a plurality of tangled cables in a container, for which locating cable connector ends of a particular cable can be used to assist in assembling, upgrading or reconfiguring a network or system, in accordance with one or more aspects of the present invention.

FIG. 2 illustrates another issue which can be encountered with cables to be used for coupling or interconnecting product components of a network or system together. Oftentimes, with a large number of cables, it can be difficult to go through and locate a particular connector end, or cable, that a user wishes to use. More particularly, as illustrated, cables 120 can be tangled or otherwise bundled together, for instance, on the floor, or in a container, where it is difficult to locate which cable connectors 121 are associated with which cable 120. Accordingly, a mechanism for assisting cable use by locating cable connector ends of a particular cable more efficiently, in a less time-consuming manner than manually sorting through tangled cables, or manually tracing a cable from one end to another end, will be beneficial.

Disclosed herein, in one or more aspects, are methods, systems and computer program products which, for instance, assist in cable plugging within a network by assisting in locating connector ends of a cable using, for example, a mobile device and wireless communication tags (or tag circuits), such as near-field communication (NFC) tags, associated with cable connectors at the ends of the cables to be plugged in the network. As is known, NFC tags employ a set of communication protocols that enable an electronic device, such as a mobile device, to establish communication by bringing the device and tag within a set distance of each other. For instance, in one or more implementations, NFC tags may operate at a frequency of 13.56 MHz, and have a read distance of 1-1.5 meters (ISO/IEC 15693), or less, such as within 10-20 cms. Current NFC tags may have a maximum memory size of about 8 kB, and a maximum transfer rate of about 424 kB/s for reading or writing. Many mobile devices today include NFC technology, which may be used in different settings to transfer information. For instance, in a retail environment, NFC communications may be employed between devices to, for instance, pay a credit card, receive credit for a loyalty program, receive coupons, etc.

Note that although described hereinbelow with reference to NFC communications and NFC tags, near-field communication protocols are one example of a short range wireless communication protocol which may be employed as part of providing cable plugging guidance, in accordance with one or more aspects of the present invention. Those skilled in the art will understand that other short range wireless communication protocols could be employed, such as Bluetooth communications, short range Wi-Fi, radio frequency identification (RFID), etc.

Before discussing implementing locating of cable connectors, in accordance with one or more aspects of the present invention, mobile devices are briefly described. By way of example, in one or more embodiments, a mobile device can have a wireless communication capability, and be, for instance, a mobile phone, a personal digital assistant (PDA), a wireless computer, a laptop computer, tablet, etc. The communication capability or system may be, for instance, a Code Division Multiple Access (CDMA) system, a Global System for Mobile Communication (GSM), a Wideband CDMA (W-CDMA) system, a Long-Term Evolution (LTE) system, an LTE Advanced system, etc.

The mobile device can be capable of providing bidirectional communication via a receive path and a transmit path. On the receive path, signals transmitted by another device or tag can be received by an antenna, and provided to a receiver. The receiver conditions and digitizes the receive signals, and provides the conditioned and digitized signals to a digital section of the mobile device for further processing. On a transmit path, a transmitter can receive data to be transmitted from the digital section, and process and condition the data, and generate a modulated signal, which may be transmitted via the antenna to one or more other devices, systems, etc. The receiver and the transmitter are part of the transceiver, and support, for instance, CDMA, GSM, W-CDMA, LTE, LTE Advanced, etc.

The digital section of the mobile device can include various processing, interfaces, and memory units, such as, for example, a modem processor, a reduced instruction set computer/digital signal processor (RISC/DSP), a controller/processor, an internal memory, a generalized audio encoder, a generalized audio decoder, a graphics/display processor, and/or an external bus interface (EBI). The modem processor can perform processing for data transmission and reception, for example, encoding, modulation, demodulation, and decoding. The RISC/DSP can perform general and specialized processing for the wireless device. In one or more embodiments, the controller/processor controls the operation of various processing and interface units within the digital section. The internal memory stores data and/or instructions for various units within the digital section.

A generalized audio encoder performs encoding for input signals from an audio source, a microphone, etc. A generalized audio decoder performs decoding for coded audio data and provides output signals to, for instance, a speaker/headset. It should be noted that the generalized audio encoder and the generalized audio decoder are not necessarily required for interface with the audio source, the microphone, and speaker/headset, and thus, may not be part of the mobile device. The graphics/display processor performs processing for graphics, videos, images, and texts, which are presented to a display unit. The EBI facilitates the transfer of data between the digital section and a main memory. The digital section may be implemented with one or more processors, DSPs, microprocessors, RISCs, etc. The digital section may also be fabricated on one or more application-specific integrated circuits (ASICs), and/or other types of integrated circuits (ICs).

In general, a mobile device such as described herein is indicative of various types of devices, such as a wireless phone, a cellular phone, a laptop computer, a wireless multimedia device, a tablet, a wireless communication personal computer (PC), a PDA, etc. In one or more implementations, any such mobile device has memory for storing instructions and data, as well as hardware, software, and firmware, and/or combinations thereof, which can be used, for instance, to implement one or more aspects of the processing described herein.

In one or more aspects, providing cable locating guidance as disclosed herein advantageously allows a user to locate connector ends belonging to a particular cable to assist, for instance, in assembling, upgrading or reconfiguring a network or system. Using the processes disclosed herein, a user is freed of any need to trace a cable back to an opposite cable end that may already be plugged within the network, for instance, in order to ascertain where a second cable end is to be plugged. In addition, the processes disclosed allow a user to avoid sending power or other signals through a cable to identify both ends of the cable in a case where the cable may run a long distance, such as between rooms. Further, the various aspects disclosed herein free a user from having to plug a second cable connector of a cable immediately after plugging a first cable connector of the cable, since there is no concern for having multiple second cable connectors grouped together. This may speed up overall time required to complete the network plugging process, or allow a user to take breaks during the plugging process without risk of losing place. Further, the various aspects disclosed herein may allow multiple users to plug multiple cable ends substantially simultaneously.

Those skilled in the art will note that the various aspects disclosed herein improve the technical field of computer or communications networking by facilitating or assisting in use of a cable during setup, upgrade, repair or reconfiguring of a network or system having multiple product components interconnected by cables. Further, the one or more aspects disclosed herein are inextricably tied to computer technology in that the cables exists for and relate directly to setup, upgrade, reconfiguration, etc., of a network or system, where multiple cables interconnect a number of product components of the network or system.

Generally stated, in one or more embodiments, a method, system and computer program product are disclosed for assisting a user in using a cable by facilitating locating connector ends of the cable. The process includes obtaining saved cable identifying information received, or saved, from a tag circuit associated with one connector end of a cable of a plurality of connector ends of multiple cables, and comparing the saved cable identifying information with cable identifying information of one or more other tag circuits associated with one or more other connector ends of the plurality of connector ends. Further, the method includes based on the comparing identifying a cable match, indicating the cable match via an indicator associated with the other connector end, thereby identifying the other connector end as part of the cable to facilitate use of the cable in, for instance, assembling, upgrading or reconfiguring a network or system.

Figure 3:
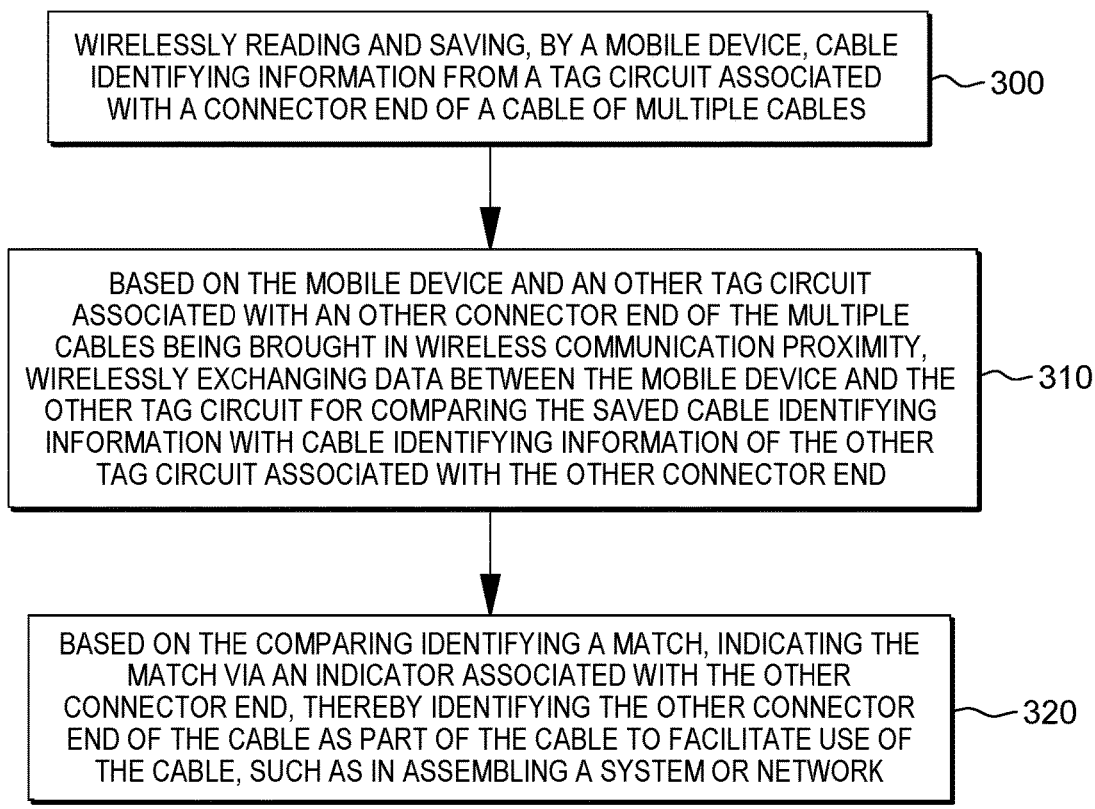
FIG. 3 depicts one embodiment of a process for assisting locating cable connector ends of a cable to facilitate use of the cable, in accordance with one or more aspects of the present invention.
Figure 4:
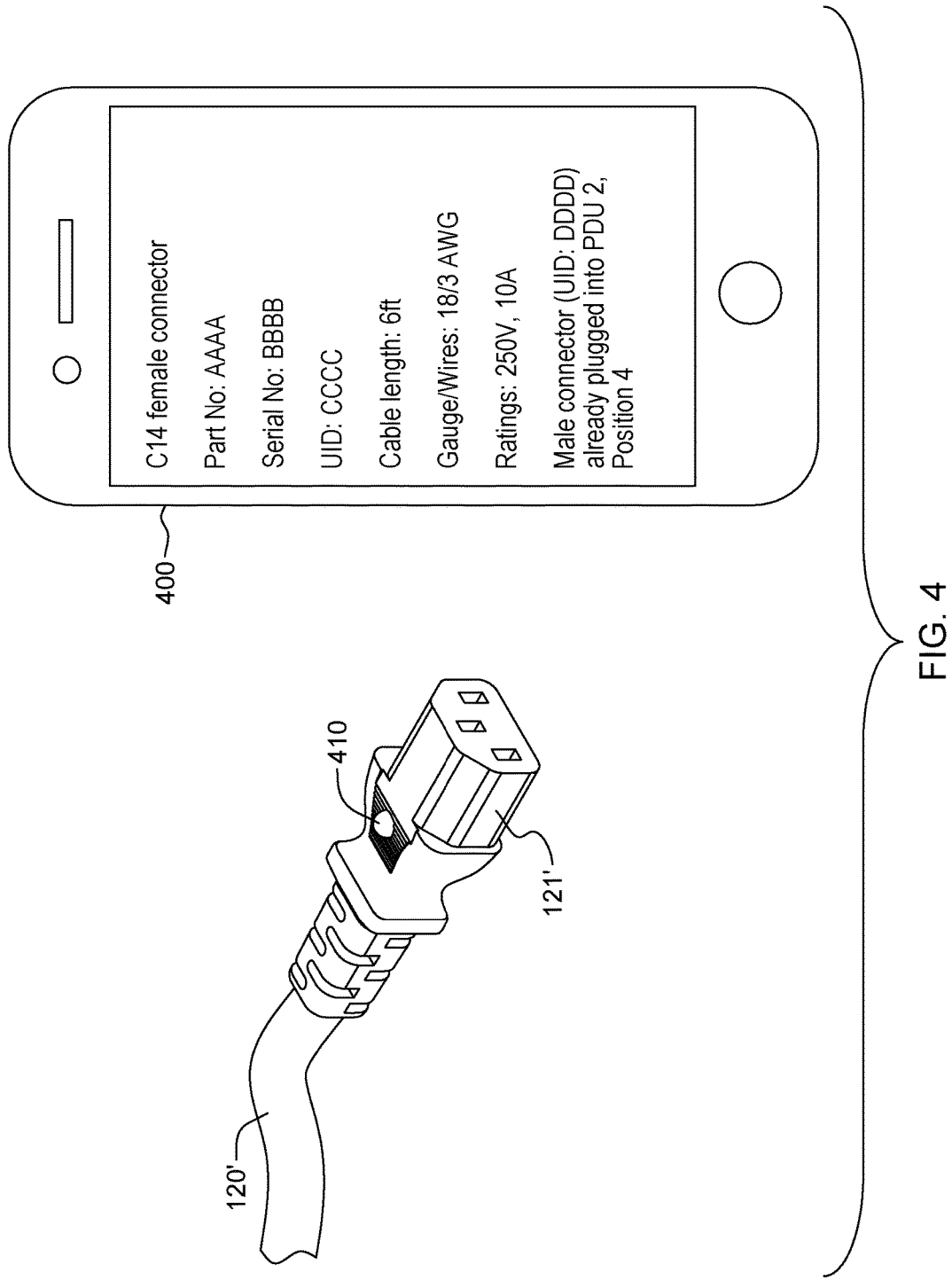
FIG. 4 depicts one embodiment of a mobile device wirelessly reading cable identifying information from a tag circuit associated with a cable connector (or connector end) of a cable, in accordance with one or more aspects of the present invention.

FIG. 3 depicts one embodiment of a process in accordance with one or more aspects of the present invention, where a mobile device wirelessly reads and saves cable identifying information from a tag circuit associated with a connector end of a cable of multiple cables 300. An example of this is depicted in FIG. 4, where a mobile device 400, in one or more implementations, powers and wirelessly reads, cable identifying information (e.g., a unique identifier or unique identifying information (UID)) from a tag circuit 410 associated with a cable connector or connector end 121' of a cable 120'. This may occur as part of a process of plugging one or more cables into a network in order to, for instance, setup, upgrade or reconfigure a system or network containing multiple product components interconnected by cables. As noted, in one or more implementations, the tag or tag circuit may be a near field communication (NFC) tag, and each cable connector at the opposite ends of the cable may have a respective NFC tag circuit associated therewith, each containing appropriate cable identifying information. The NFC tags may be shielded from the cables, and any circuitry inside the respective cable connectors, such that interference does not occur at NFC frequencies of 13.56 MHz, or NFC harmonics (e.g., 40.68 MHz for a third harmonic, or 67.80 MHz for a fifth harmonic). As noted, the tag circuits may be built into the respective cable connectors, or associated in some way by being physically attached to the cable connectors. Where the tag is an NFC tag, the tag may be a passive NFC tag (as assumed above), in which case, the mobile device powers the tag in order to read data from the tag. In the case where the tag circuit is an active NFC tag circuit, the tag circuit can read and send information, making the tag circuit effectively a transceiver. As noted, other wireless communication technologies can alternatively be employed. However, a proximity-based method such as NFC can be advantageous in an environment where there may be tens or even hundreds of cables, and cable connectors to be plugged into the network can be in close proximity, and/or even tangled.

In one or more embodiments, the cable identifying information can be stored (i.e., saved or programmed) into the associated tag circuit, and may include a variety of applicable data. By way of example only, the cable identifying information can include a cable unique identification (UID), as well as, for instance, the type of cable connector the tag is attached to, the type of cable the tag is attached to, a part number, a serial number, wire gauge for the cable, a number of conductors, various cable connector attributes, electrical ratings, locations where the connector may be properly plugged into a network, identification of one or more other connectors attached to the same cable, etc.

Continuing with FIG. 3, based on the mobile device and an other tag circuit associated with an other connector end of the multiple cables being brought into wireless communication proximity, data can be wirelessly exchanged between the mobile device and the other tag circuit for comparing the saved cable identifying information with cable identifying information of the other tag circuit associated with the other connector end 310. The data being wirelessly exchanged can depend on the particular implementation. For instance, in one or more embodiments, the saved cable identifying information from the first tag circuit may be transmitted to the other (or second) tag circuit for comparison with the other tag circuit's cable identifying information. Alternatively, the other tag circuit's cable identifying information could be wirelessly transmitted to the mobile device for comparison at the mobile device with the previously saved cable identifying information of the first tag circuit. Based on the comparing identifying a match, the match is indicated via an indicator associated with the other connector end, thereby identifying the other connector end of the cable as part of the cable, and thereby facilitating use of the cable, such as in assembling a system or network 320. Note in this regard that the indicator can be, for instance, one or more of a variety of types of indicators, such as a visual indicator, audio indicator, and/or tactile indicator, etc.

Figure 5:
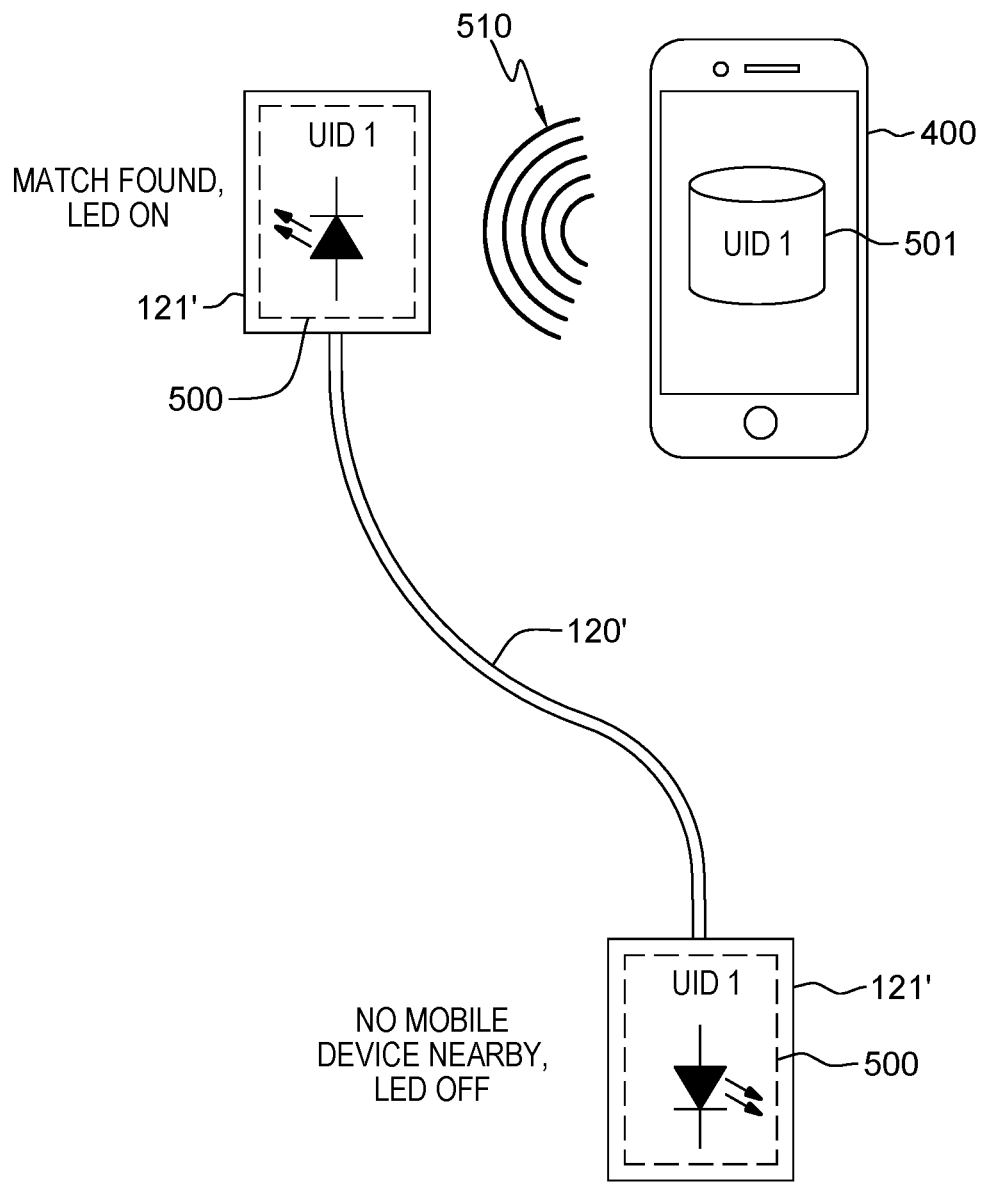
FIG. 5 depicts one embodiment of exchange of data between a mobile device and a tag circuit at one connector end of a cable to facilitate locating connector ends of a particular cable, in accordance with one or more aspects of the present invention.

As an example, FIG. 5 depicts one embodiment of mobile device 400 powering a passive tag 500 associated with a cable connector 121' of a cable 120' to be plugged in a network, such as discussed herein. As noted, in one or more implementations, the tag circuit 500 can be, or include, a near-field communication (NFC) tag, and each cable connector 121' at the opposite ends of cable 120' may have a respective NFC tag 500 associated therewith, each containing appropriate information for that cable and/or cable connector. Also as noted, the NFC tags may be shielded from the cables, and any circuitry inside the respective cable connectors, such that interference does not occur at NFC frequencies or NFC harmonics if the cable is plugged during scanning. Further, the tags or tag circuits 500 can be built into the respective cable connectors, or physically attached to the connectors. Where the tag is an NFC tag, the tag can be a passive NFC tag (as noted above), in which case, the mobile device powers the tag in order to communicate with the tag, such as to read data from the tag. In the embodiment of FIG. 5, each connector end 121' also includes an indicator, such as a light emitting diode associated with the respective connector.

As noted, in one or more embodiments, mobile device 400 wirelessly reads and saves cable identifying information 501 (e.g., UID 1) from one or more first cable connectors of multiple cables. This saved cable identifying information 501 can be saved in a list of such cable identifying information read from multiple tag circuits, which can then be used to identify multiple cables. When mobile device 400 is brought into wireless communication proximity 510 to one or more other (or second) connector ends 500, the saved cable identifying information 501 is compared with the respective, local cable identifying information of each connector end's tag. If there is a match, then the indicator associated with that tag is activated to identify the match. For instance, where the indicator is, or includes, a light emitting diode, the light emitting diode on the particular cable connector end that contains the matching cable identifying information lights up. Haptic feedback or notification to the mobile device could also be employed to help alert a user to the match. Thus, the various aspects disclosed herein allow the user to quickly and efficiently locate the appropriate cable connector end(s) in a large group of cables, even where the cables are tangled, bundled, or otherwise hard to track from one end to the other.

Figure 6:
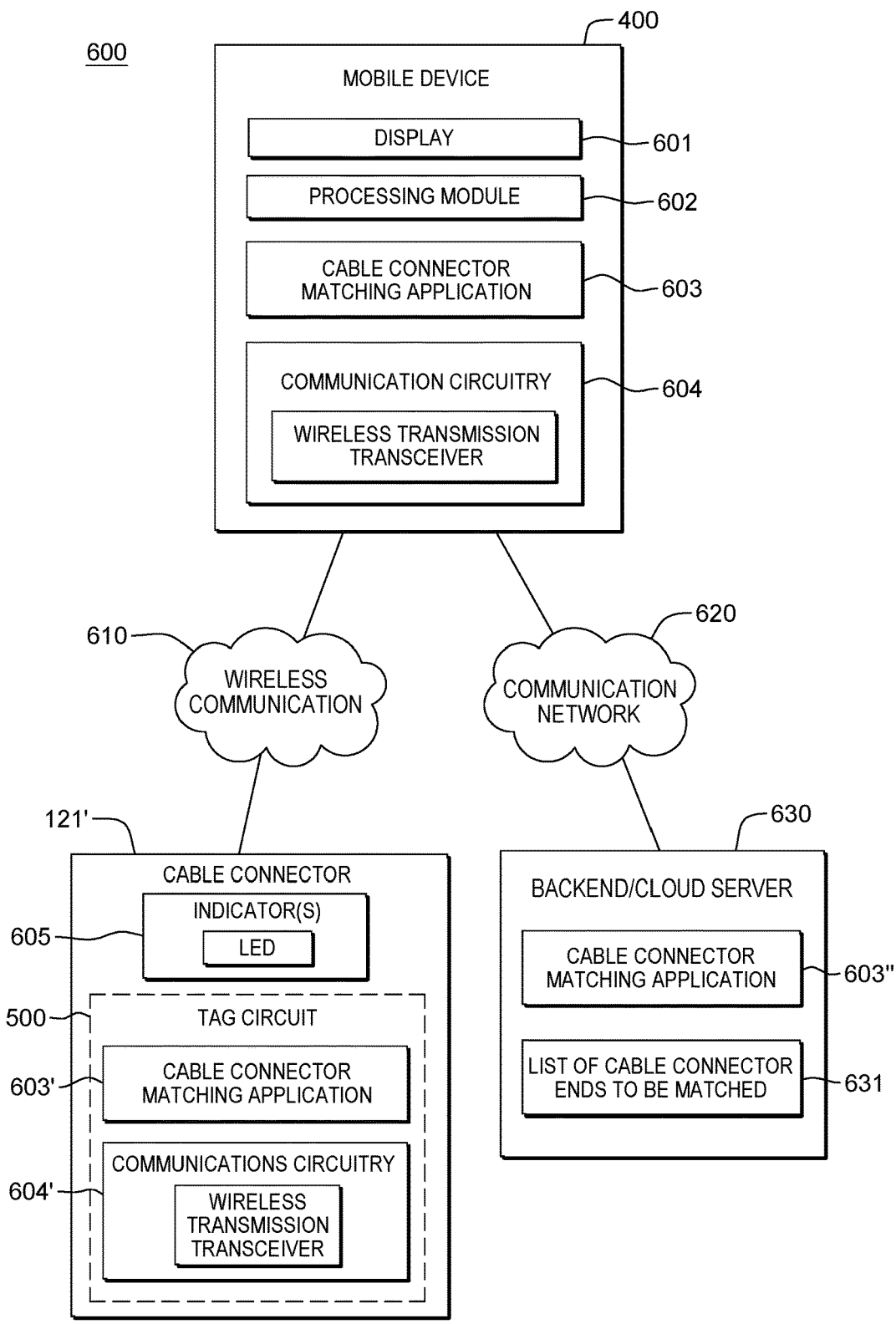
FIG. 6 depicts one embodiment of a system for locating connector ends of a cable to assist in assembling, upgrading or reconfiguring a network or system, in accordance with one or more aspects of the present invention.

FIG. 6 depicts one embodiment of a system 600 for assisting cable use by locating connector ends of a cable, in accordance with one or more aspects of the present invention. System 600 includes one or more mobile devices 400, such as described above, for wirelessly communicating 610 with (and optionally wirelessly powering) one or more tag circuits 500 associated with one or more cable connectors 121' at the connector ends of one or more cables (not shown). In one or more implementations, the wireless communication 610 may be a short range wireless link, such as near field communication (NFC), that is available with many mobile devices. In one or more alternate embodiments, a different wireless protocol, such as short-range Wi-Fi, Bluetooth, etc., could be employed. Wireless communication 610 is advantageously a short-range wireless network so that mobile device 400 wirelessly communicates with a limited number of tag circuits 500 (such as NFC devices) to limit power from being distributed between too many tag circuits such that one or more of the circuits may receive insufficient power to turn on. Short-range wireless communication is also beneficial to the aspects disclosed herein since an indicator, such as a light emitting diode that is illuminated, should be close enough to the user so that the user is able to detect the indication. For instance, if Bluetooth protocol were employed and the illuminated connector end was across a room or in a different room, the user may be unable to see the indicator.

In one or more implementations, mobile device 400 includes a display 601, a processing module 602, a cable connector matching application 603 (e.g., circuit, module, logic, process, etc.), and communication circuitry 604, which may include a wireless transmission transceiver, such as a wireless, proximity-based transceiver. Note that mobile device 400 may include many additional or different components, modules, subsystems, etc., without departing from the spirit of the present invention.

Figure 9:
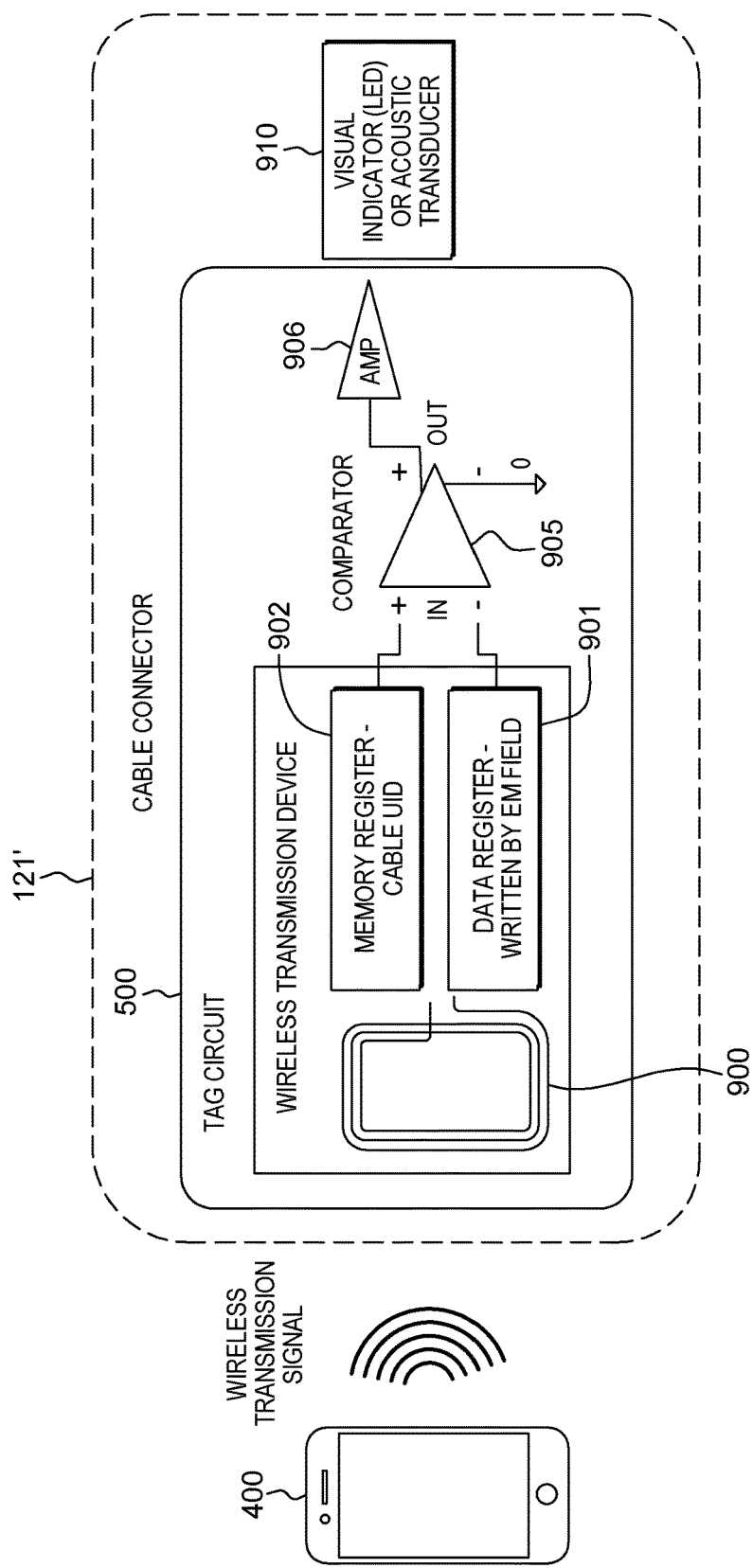
FIG. 9 depicts one embodiment of a mobile device exchanging data with a tag circuit at a connector end of a cable, in accordance with one or more aspects of the present invention.

Further, in one or more embodiments, each cable connector or connector end 121' of a cable may include a tag circuit 500 and one or more associated indictors 605, such as a light emitting diode indicator. As shown, in one or more implementations, tag circuit 500 includes a cable connector matching application 603' (e.g., circuit, module, logic, process, etc.) and network communications 604', such as a wireless transmission transceiver. By way of example, the wireless transmission transceiver can receive power from, and send data to and receive data from, mobile device 400 when mobile device 400 is within wireless communication proximity to cable connector 121'. A processing module or logic circuit, such as shown in FIG. 9, can be included to determine whether or not to activate the indicator(s) 605. In one or more implementations, the indicator may be illuminated when, for instance, a first cable end is scanned into the mobile device (i.e., cable identifying information from a first cable end is saved) and/or when a match is found when comparing cable identifying information saved on a second cable end to saved cable identifying information from the first cable end.

In one or more embodiments of system 600, mobile device 400 can be in communication via a communication network 620 with a remote or backend/cloud server 630. In implementation, communication network 620 can be any medium used to provide communication links between various devices and computers connected together within a processing environment. For instance, network 620 can include a variety of connections, such as wires, wireless communication links, fiber optic cables, etc. In one or more embodiments, network 620 can utilize the internet, or a different type of network, such as an intranet, a local area network (LAN), a wide area network (WAN), a wireless network, etc. Backend/cloud server 630 can be implemented as any of a variety of computer systems, such as those described below with reference to FIGS. 11-13. Also, note in this regard, that illustrative aspects described herein can be applied to any of a variety of computing environments. In the example of FIG. 6, server 630 can be a backend/cloud-based server, and can include, for instance, a corresponding cable connector matching application 603", and can also be used to store a current list of first connector end UIDs to be matched 631, if desired. List 631 may be advantageous for two or more users that are plugging cables within the same network such that they can share information about which cable connector the other user has scanned (e.g., two users on opposite sides of a server rack, two users plugging cables that span across multiple rooms, etc.). Alternatively, the current list of first connector end UIDs could remain stored on mobile device 400. Those skilled in the art will note that the cable connector matching application 603 of mobile device 400, cable connector matching application 603' of tag circuit 500 and cable connector matching application 603" of backend/cloud server 630 can be configured similarly or differently, as desired, to implement one or more of the aspects disclosed herein for facilitating cable or connector end matching as described herein.

Figure 7:
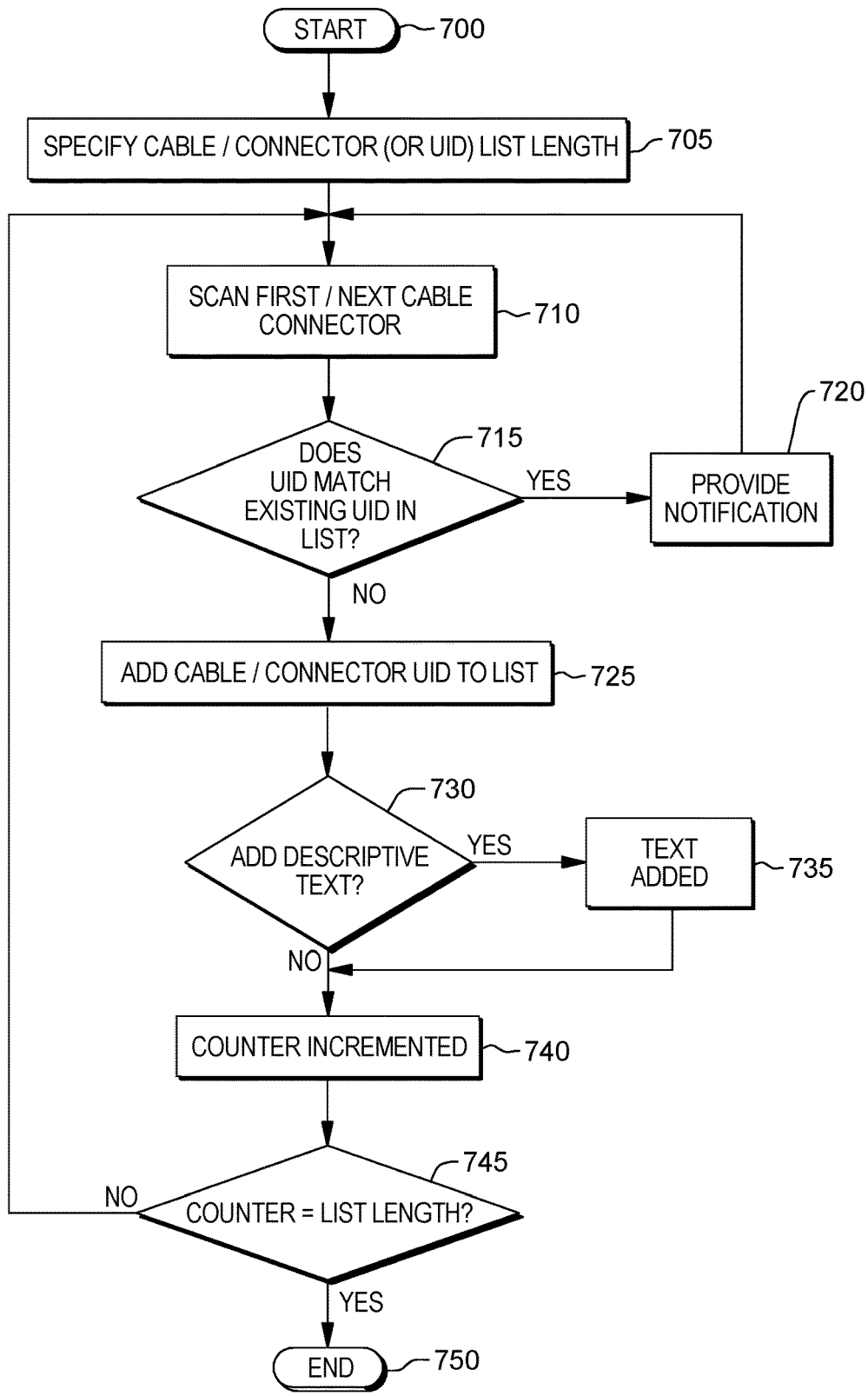
FIG. 7 depicts one embodiment of a process for saving and creating a list of saved cable identifying information scanned from multiple connector ends of multiple cables, in accordance with one or more aspects of the present invention.

FIG. 7 depicts one embodiment of a process for creating a list of cable identifying information scanned from multiple (first) connector ends of multiple cables. The depicted process starts 700 with specifying a cable/connector list length 705. For instance, a user could scan multiple first connector ends to save time, in which case a list of the scanned cable identifying information from the connector ends is created. The specified list might include one or more items. Optionally, a list length need not be specified, with as many cable connectors being scanned as desired for the list until, for instance, the list is closed by a user, or each UID is resolved by a match.

In operation, a user brings the mobile device into wireless communication proximity with a first or next cable connector to be added to the list of cable connectors 710. Note in this regard that the use of "first cable connector" could refer to either end of the cable, with "first" meaning the first end of a cable that the mobile device scans. More particularly, in one or more embodiments, when in wireless communication proximity, the wireless transmission transceiver on the mobile device powers up the passive wireless device or tag circuit on the connector end, and reads the cable identifying information from that connector end. In one or more implementations, a user may separate the connector end being scanned from other connector ends by a threshold distance, for instance, by 20 cm for NFC technology. If the user does not separate the target connector end by a threshold distance, then the mobile device could read other connector cable identifying information in the same vicinity, and depending on the implementation, may store, for instance, the cable identifying information from the cable connector that is closest to the mobile device, such as based on power or signal strength of the cable identifying information transmission. Optionally, the cable connector's associated indicator, such as an associated LED, could be activated or illuminated, when cable identifying information (e.g., UID) is transmitted to the mobile device for visual confirmation to the user that the cable connector has been scanned. Illumination of the indicator can be accomplished by broadcasting the UID with the strongest signal strength back to all the cables in wireless range, with the connector cable with the matching UID detecting the match and illuminating.

After scanning the first or next cable connector tag for addition of a cable to the list, processing determines whether that information matches an existing cable (or connector) in the list 715. In particular, scanning the first or next cable connector may include obtaining and saving cable identifying information, such as a UID for the cable, and processing determines whether the obtained cable identifying information matches an existing cable identifying information in the list. If "yes", then processing may provide a notification to the user 720 that two connector ends of the same cable have been identified.

Assuming that the newly scanned cable identifying information does not match already saved cable identifying information in the list, then the cable identifying information is added to the list 725. Optionally, the user may be prompted to add a descriptive text 730 to, for instance, provide any further description of the particular cable or connector. If "yes", then the text is added 735. For instance, the user may choose to add descriptive text (for instance, "plugs into product x", "attached to power outlet y", "cable located in room z", etc.), which may be helpful in remembering which order connectors were scanned. A counter, in the case of a list of defined length, is incremented 740, and processing determines whether the counter has reached the list length 745, and if "no", returns to read-in or obtain cable identifying information for a next cable connector 710. Once the list length has been reached, the list is complete and processing ends 750. Note that, optionally, if a list length is not specified, then the mobile device can present a selection icon allowing a user to choose whether to add further cable identifying information to the list from one or more other cable connectors, or to end the list with the last completed scan.

Figure 8:
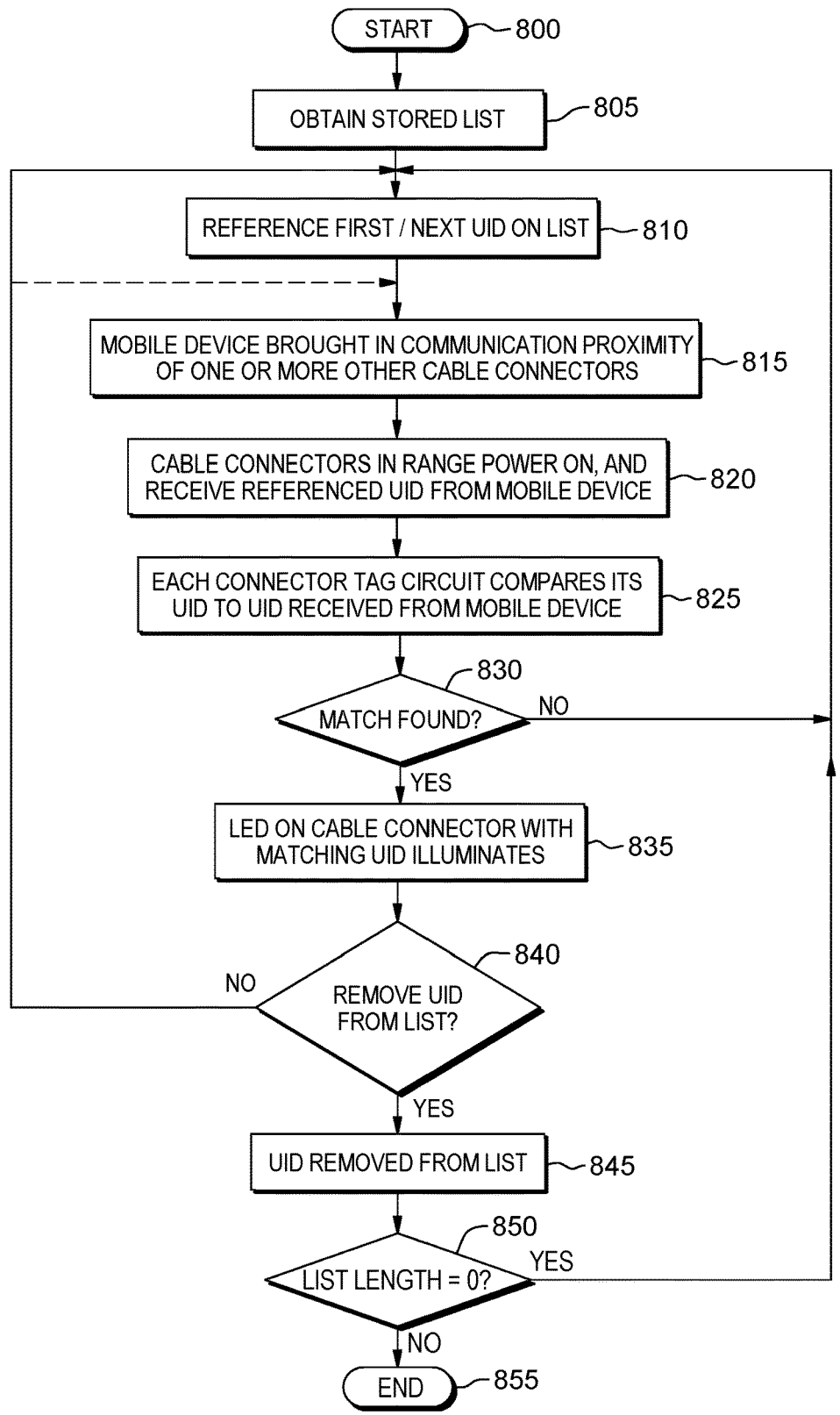
FIG. 8 depicts one embodiment of a process for comparing saved cable identifying information with cable identifying information of one or more other tag circuits associated with one or more other connector ends to identify the connector ends of a particular cable to assist in assembling, upgrading or reconfiguring a network or system, in accordance with one or more aspects of the present invention.

By way of example, FIG. 8 depicts one embodiment of a process for comparing saved cable identifying information with cable identifying information from one or more other tag circuits associated with one or more other connector ends to identify connector ends of a particular cable, and thereby assist in use of the cable, such as explained herein. The process begins 800 with the stored list being obtained 805. In one or more embodiments, the list may be stored in association with the cable connector matching application on the mobile device, or even at a backend server, if desired.

The first or next cable identifying information (or UID) on the list is referenced 810, and the mobile device is brought in communication proximity with one or more other cable connectors 815 (or more particularly, the tags associated with the connectors). Optionally, processing need not go in order, but rather, could compare the full list of UID's to each UID of the one or more other (or second) cable connector ends, and when a match is identified, the corresponding indicator may be activated on that other cable connector. Further, the mobile device can notify a user of which cable has been matched in the list.

Continuing with the process of FIG. 8, as noted, the mobile device is brought within wireless communication range of one or more other cable connectors that may be a match to, for instance, a current UID being searched 815. Any cable connector tag in wireless communication range to the mobile device can power on, and receive, in one or more embodiments, the referenced UID from the mobile device 820. Each connector tag circuit can compare its UID to the UID received from the mobile device 825 to determine if a match is found 830. If a match is not found, then the mobile device is moved into wireless communication range of one or more other cable connectors to continue searching for a matching UID. Otherwise, if a match is found, then in one or more embodiments, the indicator on the matching other cable connector is activated 835. Once the match is found, then the user can use the identified cable to, for instance, facilitate assembly of the network or system, or otherwise reconfigure, update, repair, etc. the network or system.

The mobile device can prompt the user whether the user wishes to remove the UID from the list 840, or alternatively, the application could be configured to automatically remove the matching UID from the list. The matching UID could be left on the list if, for instance, the cable is buried under many other cables, the user may need to leave to complete another task, etc. If the user chooses to not remove the UID from the list, then processing may move to the next UID on the list, or optionally, the user may choose to stay on the current UID. Assuming that the UID is to be removed from the list, then the UID is removed 845. Processing determines whether there are any further UID's (or any further cable identifying information) itemized in the list, and assuming so, returns back to reference a next UID in the list 810. If the list is empty, meaning processing has found all listed cable identifiers, processing can end 855.

FIG. 9 depicts, by way of further example, mobile device 400 communicating with a tag circuit 500 associated with one cable connector end of a cable. In one or more embodiments, tag circuit 500, or wireless transmission device, can be built into the cable or cable connector during manufacture, or could be attached to an existing cable or cable connector, such as by using an adhesive, clip or other fastener. By way of example, the wireless transmission device or tag circuit could be a SIC4310 RFID/NFC circuit chip offered by Silicon Craft Technology of Bangkok, Thailand. In one or more embodiments, the tag circuit 500 includes an antenna 900 to receive power and signal data from mobile device 400, and internal memory registers, including a data register 901, which is written by the electromagnetic field (or NFC), and a memory register, which may include the local cable identifying information (UID) 902. In one or more embodiments the local cable identifying information (UID) in register 902 could have been programmed wirelessly (e.g., EEPROM), and the data register 901 can receive the saved cable identifying information or referenced UID, from the mobile device list. As illustrated, in one or more embodiments, the UID register 901 is compared against the saved, internal UID in memory register 902 at a comparator 905, which outputs a digital signal via an amplifier 906 to drive an indicator 910 (e.g., a visual indictor (LED), acoustic transducer, etc.) to signal when there is a UID match. By way of further example, a mobile device may output, for instance, 1.3 W of power, and the power consumed by an NFC tag may be approximately 70 µW with the comparator using about 0.25 µW, and an LED 40 µW-90 µW, which totals less than 200 µW for a lit LED. Even with power loss through air, multiple connectors in range of the mobile device could operate normally without dissipating enough power to affect the ability to illuminate the correct light emitting diode.

Figure 10:
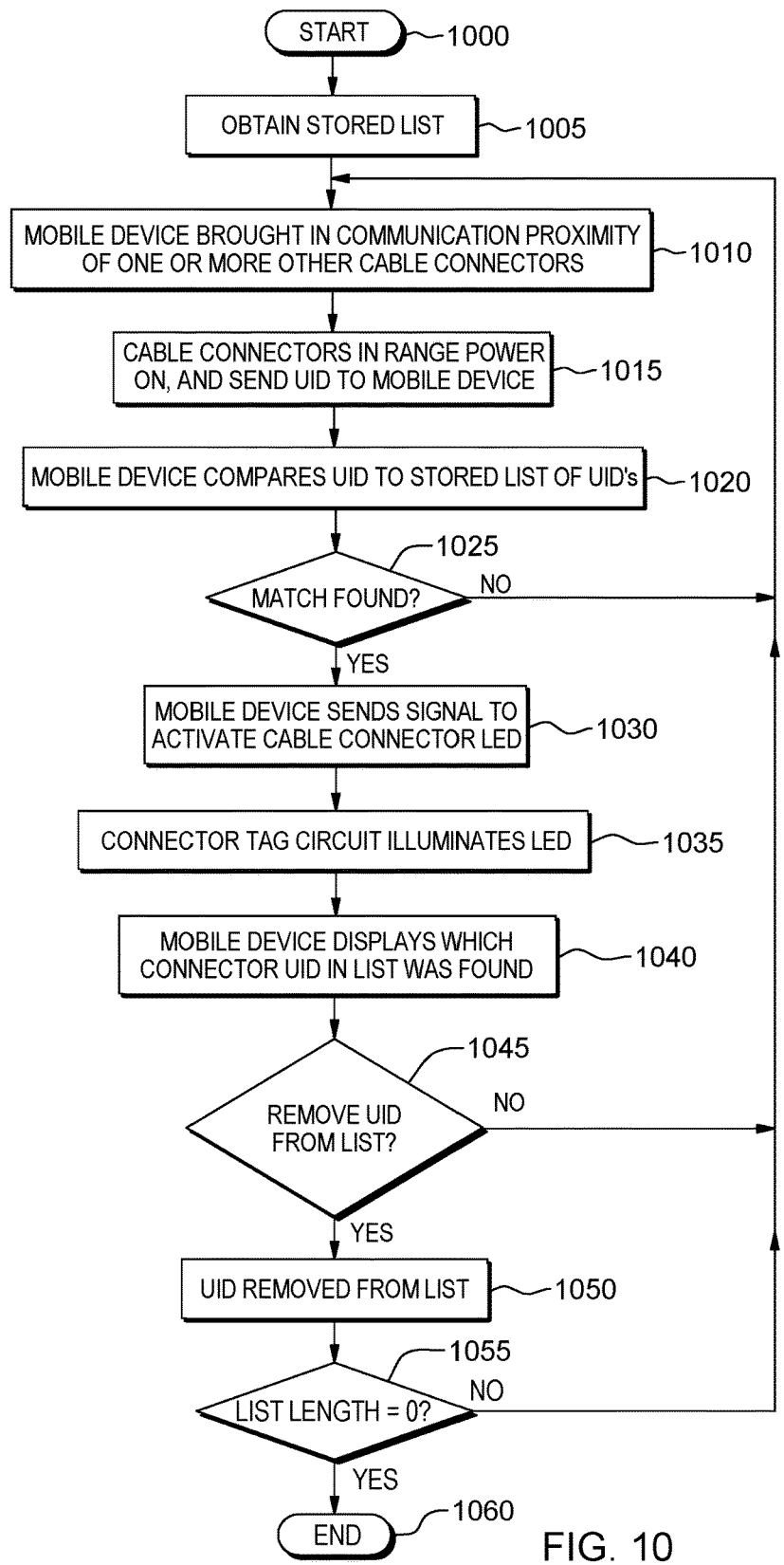
FIG. 10 depicts another embodiment of a process for comparing saved cable identifying information with cable identifying information of one or more other tag circuits associated with one or more other connector ends to identify the connector ends of a particular cable to assist in assembling, upgrading or reconfiguring a network or system, in accordance with one or more aspects of the present invention.

FIG. 10 depicts another embodiment of a process for comparing saved cable identifying information (UID) with cable identifying information (UID) of the one or more other tag circuits associated with one or more connectors. The depicted process starts 1000 with obtaining the stored list 1005, which may be created, by way of example as described above in connection with FIG. 7. In the embodiment depicted, the mobile device is brought in wireless communication proximity to one or more other (second) cable connectors 1010, and the cable connectors in range power on, and send their local UIDs to the mobile device 1015. The mobile device compares the received UIDs from the one or more other cable connectors to the stored list of UIDs 1020. Processing determines whether a match is found 1025, and if "no", then the process repeats. Where a match is found, the mobile device can send a signal to activate the correct cable connector's indicator (e.g., LED) 1030. For instance, a signal can be sent back to the cable connector, or more particularly, tag circuit which controls a switch (such as an FET, relay, etc.) that connects the indicator or LED to the antenna power source to illuminate the LED 1035. The mobile device can display which connector UID in the list was found 1040, and prompt the user whether the UID is to be removed from the list 1045. If "no", then processing returns to evaluate one or more other cable connectors 1010. Where the UID is to be removed from the list, the UID is removed 1050, and processing determines whether the list length is zero 1055, indicating that all information in the list has been matched. If "no", then processing returns to evaluate one or more other cable connectors. Otherwise, processing is complete 1060.

Exemplary embodiments of a computing environment which may implement one or more aspects of the present invention are described below with reference to FIGS. 11-13.

Figure 11:
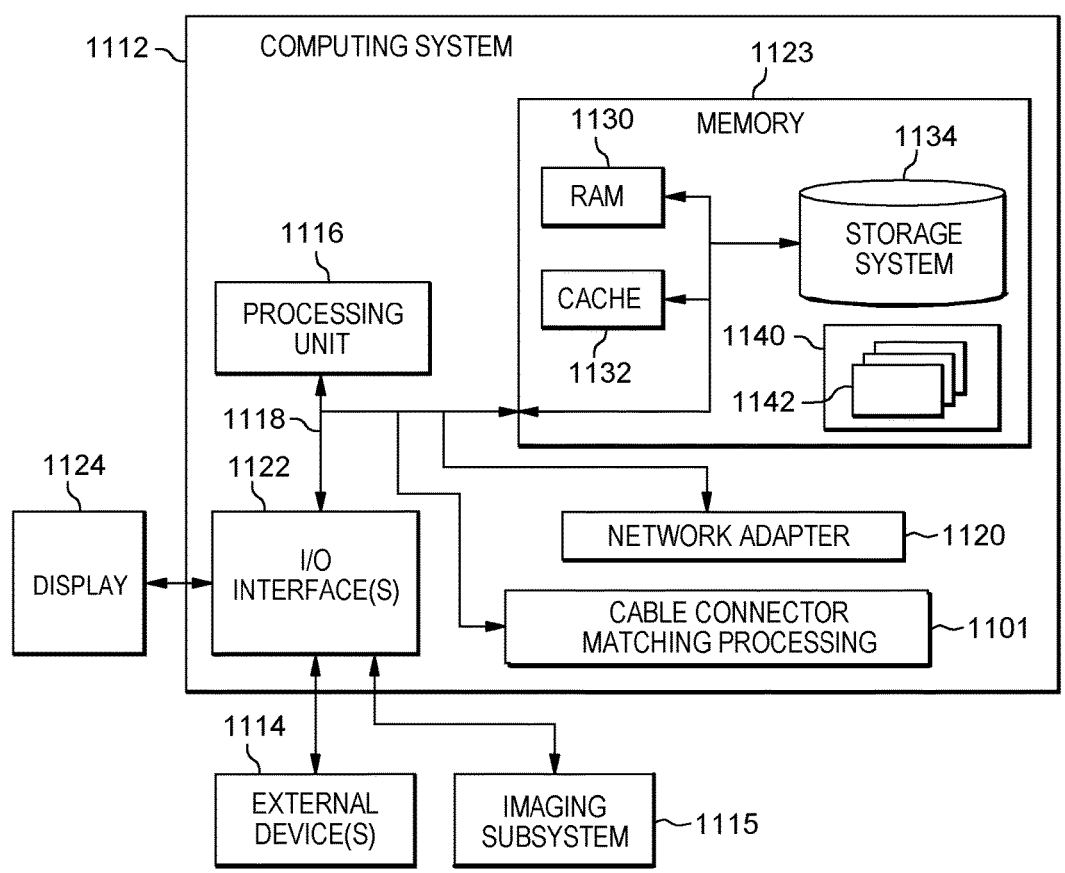
FIG. 11 depicts one embodiment of a computing system which may implement or facilitate implementing locating of cable connector ends of a cable, in accordance with one or more aspects of the present invention.

By way of further example, FIG. 11 depicts one embodiment of a computing environment 1100, which includes a computing system 1112. Examples of well-known computing systems, environments, and/or configurations that may be suitable for use with computer system 1112 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 1112 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 11, computing system 1112, is shown in the form of a general-purpose computing device. The components of computing system 1112 may include, but are not limited to, one or more processors or processing units 1116, a system memory 1123, and a bus 1118 that couples various system components including system memory 1123 to processor 1116.

In one embodiment, processor 1116 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1112 can include a variety of computer system readable media. Such media can be any available media that is accessible by computing system 1112, and it includes both volatile and non-volatile media, removable and non-removable media.

System memory 1123 can include computer system readable media in the form of volatile memory, such as random access memory (RAM) 1130 and/or cache memory 1132. Computing system 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1118 by one or more data media interfaces. As described below, memory 1123 may include at least one program product having a set (e.g., at least one) of program modules that are configured to carry out the functions of embodiments of the invention.

Program/utility 1140, having a set (at least one) of program modules 1142, may be stored in memory 1123 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein. Alternatively, a separate cable connector matching system, module, logic, etc., 1101 may be provided within computing environment 1112.

Computing system 1112 may also communicate with one or more external devices 114 such as an imaging subsystem 1115, a keyboard, a pointing device, a display 1124, etc.; one or more devices that enable a user to interact with computing system 1112; and/or any devices (e.g., network card, modem, etc.) that enable computing system 1112 to communicate with one or more other computing devices. Such communication can occur via Input/Output (I/O) interfaces 1122. Still yet, computing system 1112 can communicate with one or more networks such as a local area network (LAN), a general wide area network (WAN), and/or a public network (e.g., the Internet) via network adapter 1120. As depicted, network adapter 1120 communicates with the other components of computing system, 1112, via bus 1118. It should be understood that although not shown, other hardware and/or software components could be used in conjunction with computing system 1112. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 11. Computing system 1112 of FIG. 11 may be practiced in distributed cloud computing environments where tasks are performed by remote processing devices that are linked through a communications network. In a distributed cloud computing environment, program modules may be located in both local and remote computer system storage media including memory storage devices. Computing system 1112 is capable of being implemented and/or performing any of the functionality set forth hereinabove.

Figure 12:
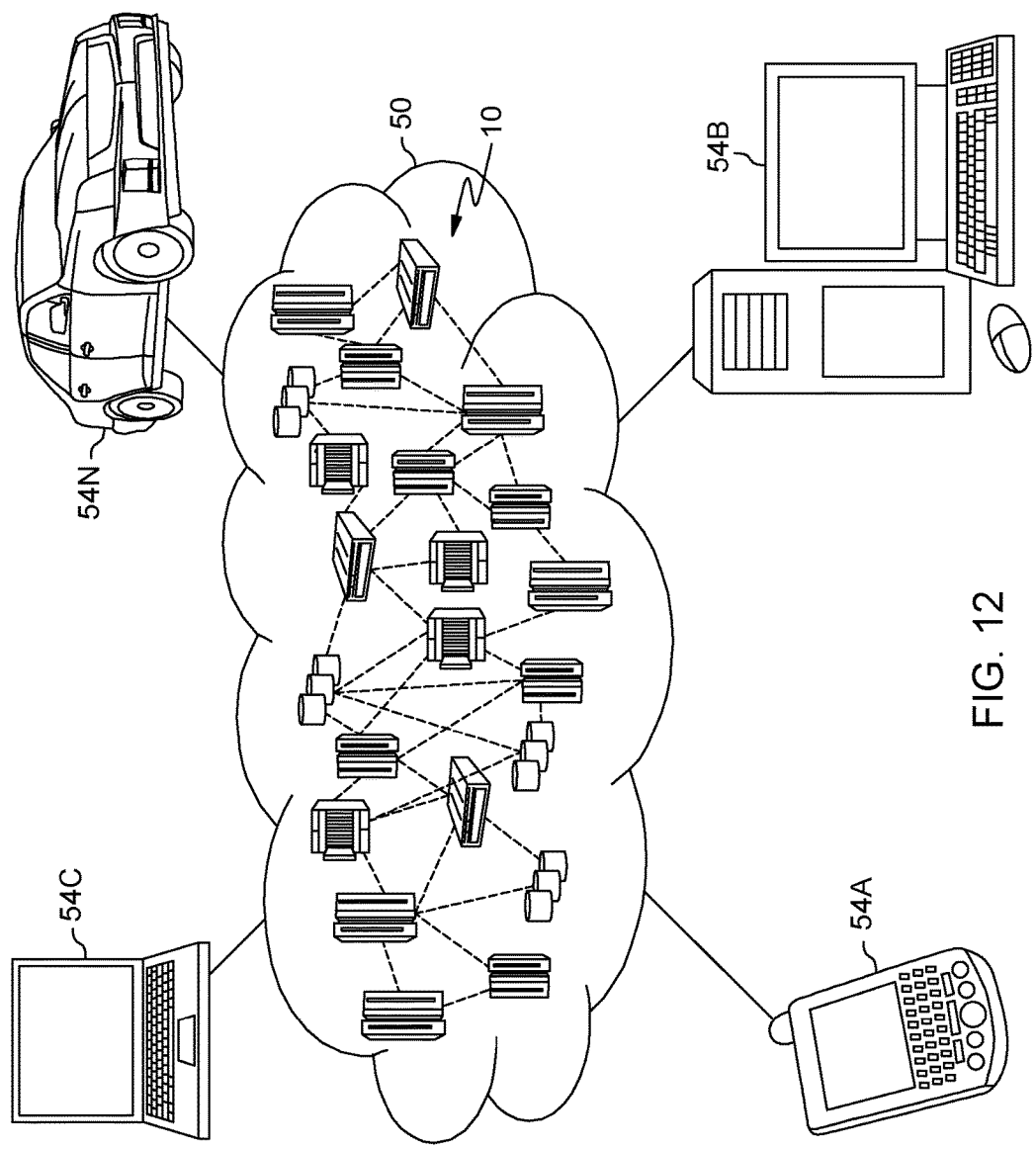
FIG. 12 depicts one embodiment of a cloud computing environment, which may implement, or be used in association with one or more aspects of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
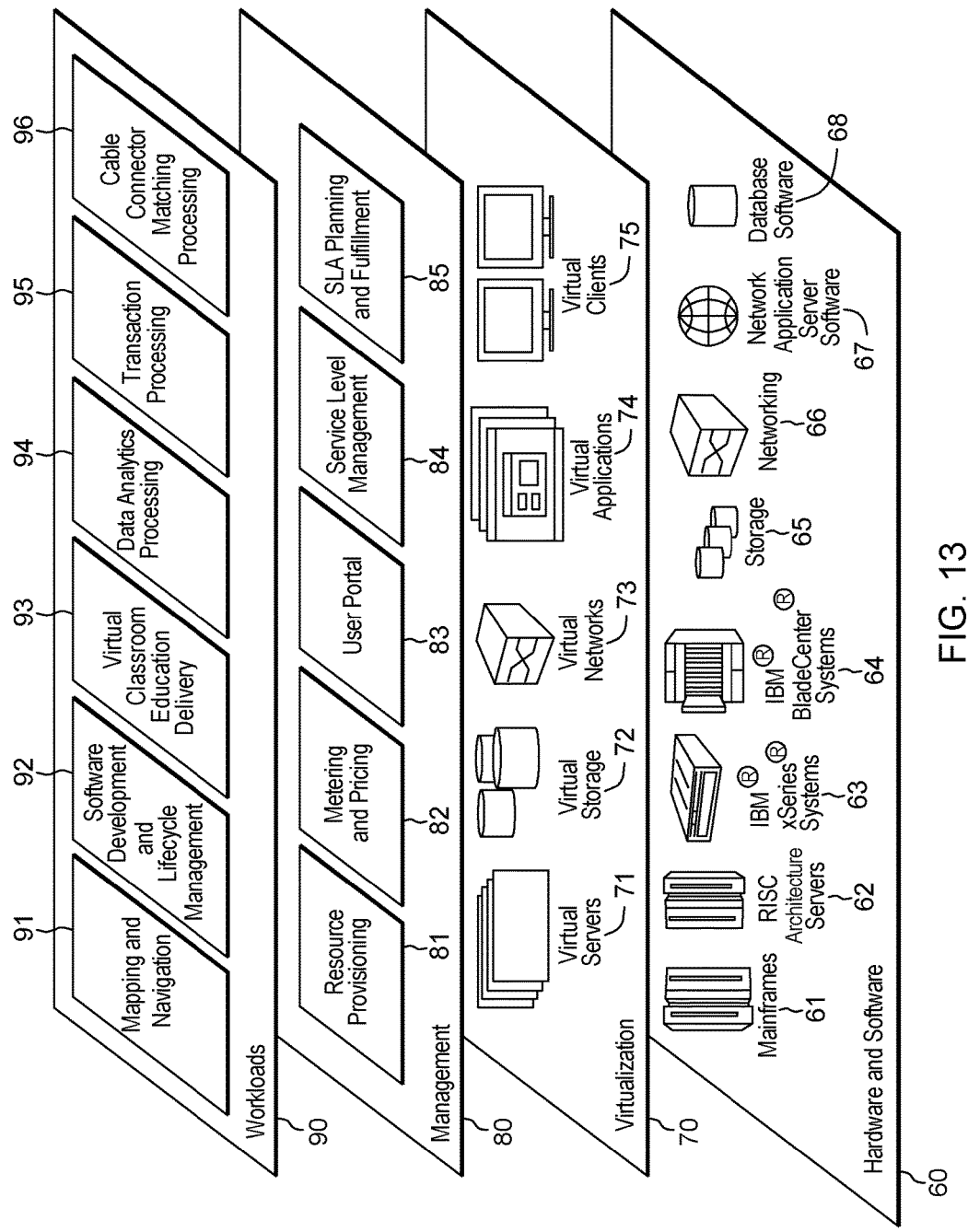
FIG. 13 depicts one example of abstraction model layers which may facilitate or implement locating of cable connector ends of a cable, in accordance with one or more aspects of the present invention.

Referring to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cable connector matching processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of assisting cable use by locating connector ends of the cable, the method comprising:
   obtaining saved cable identifying information received from a tag circuit associated with one connector end of the cable of a plurality of connector ends of multiple cables;
   comparing the saved cable identifying information with cable identifying information of an other tag circuit associated with an other connector end of the plurality of connector ends; and
   based on the comparing identifying a cable match, indicating the cable match via an indicator associated with the other connector end, thereby identifying the other connector end as part of the cable to facilitate use of the cable.

2. The method of claim 1, wherein the obtaining comprises wirelessly reading and saving, by a mobile device, the cable identifying information from the tag circuit associated with the one connector end of the cable of the plurality of connector ends of the multiple cables, and wherein the method further comprises based on the mobile device and the other tag circuit associated with the other connector end of the plurality of connector ends being in wireless communication proximity, wirelessly exchanging data between the mobile device and the other tag circuit to facilitate the comparing of the saved cable identifying information with the cable identifying information of the other tag circuit associated with the other connector end.

3. The method of claim 2, wherein the wirelessly exchanging data comprises transmitting the saved cable identifying information from the mobile device to the other tag circuit associated with the other connector end, the comparing being performed at the other tag circuit.

4. The method of claim 3, wherein the saving comprises saving the cable identifying information into a list, and the wirelessly reading and saving comprise wirelessly reading and saving into the list cable identifying information from tag circuits associated with multiple connector ends of the plurality of connector ends to facilitate locating connector ends of two or more cables of the multiple cables.

5. The method of claim 4, wherein the saving occurs at the mobile device.

6. The method of claim 3, further comprising wirelessly powering by the mobile device the other tag circuit associated with the other connector end.

7. The method of claim 2, wherein the indicating further comprises receiving a signal at the mobile device from the other tag circuit indicative of the cable match.

8. The method of claim 2, wherein the wirelessly exchanging data comprises receiving at the mobile device the cable identifying information of the other tag circuit associated with the other connector end, and wherein the comparing occurs at the mobile device.

9. The method of claim 8, further comprising transmitting, based on identifying the cable match, a signal from the mobile device to the other tag circuit associated with the other connector end to indicate the cable match via the indicator associated with the other connector end.

10. The method of claim 1, wherein the indicator comprises a light emitting diode, and the indicating comprises illuminating the light emitting diode at the other connector end of the cable.

11. A system for assisting cable use by locating connector ends of the cable, the system comprising:
    a memory; and
    a processing circuit communicatively coupled to the memory, wherein the system performs a method comprising:
       obtaining saved cable identifying information received from a tag circuit associated with one connector end of the cable of a plurality of connector ends of multiple cables;
       comparing the saved cable identifying information with cable identifying information of an other tag circuit associated with an other connector end of the plurality of connector ends; and
       based on the comparing identifying a cable match, indicating the cable match via an indicator associated with the other connector end, thereby identifying the other connector end as part of the cable to facilitate use of the cable.

12. The system of claim 11, wherein the obtaining comprises wirelessly reading and saving, by a mobile device, the cable identifying information from the tag circuit associated with the one connector end of the cable of the plurality of connector ends of the multiple cables, and wherein the method further comprises based on the mobile device and the other tag circuit associated with the other connector end of the plurality of connector ends being in wireless communication proximity, wirelessly exchanging data between the mobile device and the other tag circuit to facilitate the comparing of the saved cable identifying information with the cable identifying information of the other tag circuit associated with the other connector end.

13. The system of claim 12, wherein the wirelessly exchanging data comprises transmitting the saved cable identifying information from the mobile device to the other tag circuit associated with the other connector end, the comparing being performed at the other tag circuit.

14. The system of claim 13, wherein the saving comprises saving the cable identifying information into a list, and the wirelessly reading and saving comprise wirelessly reading and saving into the list cable identifying information from tag circuits associated with multiple connector ends of the plurality of connector ends to facilitate locating connector ends of two or more cables of the multiple cables.

15. The system of claim 12, wherein the wirelessly exchanging data comprises receiving at the mobile device the cable identifying information of the other tag circuit associated with the other connector end, and wherein the comparing occurs at the mobile device.

16. The system of claim 15, further comprising transmitting, based on identifying the cable match, a signal from the mobile device to the other tag circuit associated with the other connector end to indicate the cable match via the indicator associated with the other connector end.

17. The system of claim 11, wherein the indicator comprises a light emitting diode, and the indicating comprises illuminating the light emitting diode at the other connector end of the cable.

18. A computer program product for assisting cable use by locating connector ends of the cable, the computer program product comprising:

a non-transitory computer readable storage medium having program instructions embodied therewith, the program instructions being executable by a processor to cause the processor to:
        obtain saved cable identifying information received from a tag circuit associated with one connector end of the cable of a plurality of connector ends of multiple cables;
        compare the saved cable identifying information with cable identifying information of an other tag circuit associated with an other connector end of the plurality of connector ends; and
        based on the compare identifying a cable match, indicate the cable match via an indicator associated with the other connector end, thereby identifying the other connector end as part of the cable to facilitate use of the cable.

19. The computer program product of claim 18, wherein the obtaining comprises wirelessly reading and saving, by a mobile device, the cable identifying information from the tag circuit associated with the one connector end of the cable of the plurality of connector ends of the multiple cables, and wherein the method further comprises based on the mobile device and the other tag circuit associated with the other connector end of the plurality of connector ends being in wireless communication proximity, wirelessly exchanging data between the mobile device and the other tag circuit to facilitate the comparing of the saved cable identifying information with the cable identifying information of the other tag circuit associated with the other connector end.

20. The computer program product of claim 19, wherein the wirelessly exchanging data comprises transmitting the saved cable identifying information from the mobile device to the other tag circuit associated with the other connector end, the comparing being performed at the other tag circuit.

\* \* \* \* \*